US008174984B2

(12) United States Patent
Tripathi et al.

(10) Patent No.: US 8,174,984 B2
(45) Date of Patent: May 8, 2012

(54) MANAGING TRAFFIC ON VIRTUALIZED LANES BETWEEN A NETWORK SWITCH AND A VIRTUAL MACHINE

(75) Inventors: Sunay Tripathi, Palo Alto, CA (US);
Nicolas G. Droux, Rio Rancho, NM (US); Kais Belgaied, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 250 days.

(21) Appl. No.: 12/474,671

(22) Filed: May 29, 2009

(65) Prior Publication Data
US 2010/0303075 A1   Dec. 2, 2010

(51) Int. Cl.
*G01R 31/08* (2006.01)
(52) U.S. Cl. .................................. 370/235
(58) Field of Classification Search .......... 370/389, 370/392, 412, 229, 235
See application file for complete search history.

(56) References Cited

U.S. PATENT DOCUMENTS

| 6,041,053 | A  | 3/2000  | Douceur et al. |
|---|---|---|---|
| 6,070,219 | A  | 5/2000  | McAlpine et al. |
| 6,131,163 | A  | 10/2000 | Wiegel |
| 6,163,539 | A  | 12/2000 | Alexander et al. |
| 6,477,643 | B1 | 11/2002 | Vorbach et al. |
| 6,600,721 | B2 | 7/2003  | Edholm |
| 6,714,960 | B1 | 3/2004  | Bitar et al. |
| 6,757,731 | B1 | 6/2004  | Barnes et al. |
| 6,831,893 | B1 | 12/2004 | Ben Nun et al. |
| 6,859,841 | B2 | 2/2005  | Narad et al. |
| 6,944,168 | B2 | 9/2005  | Paatela et al. |
| 7,046,665 | B1 | 5/2006  | Walrand et al. |
| 7,076,569 | B1 * | 7/2006 | Bailey et al. .................. 709/250 |
| 7,146,431 | B2 | 12/2006 | Hipp et al. |
| 7,177,311 | B1 | 2/2007  | Hussain et al. |

(Continued)

FOREIGN PATENT DOCUMENTS

WO    2006/124414 A2    11/2006

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 pages).

(Continued)

*Primary Examiner* — Man Phan
*Assistant Examiner* — Kevin Lee
(74) *Attorney, Agent, or Firm* — Osha • Liang LLP

(57) ABSTRACT

A computer readable medium comprising software instructions for managing resources on a host, wherein the software instructions comprise functionality to: configure a classifier located on a NIC, to forward packets addressed to a first destination address to a first HRR mapped to a first VNIC, wherein packets addressed to the first destination address are associated with a first PFC lane; configure the classifier to forward packets addressed to a second destination address to a second HRR, wherein packets addressed to the second destination address are associated with a second PFC lane; and transmit, by the first VNIC, a pause frame associated with the first PFC lane to a switch operatively connected to the physical NIC, wherein the switch, in response to receiving the pause frame, stores packets associated with the first PFC lane in a buffer without transmitting the packets.

11 Claims, 8 Drawing Sheets

U.S. PATENT DOCUMENTS

| | | | |
|---|---|---|---|
| 7,260,102 | B2 | 8/2007 | Mehrvar et al. |
| 7,313,142 | B2 | 12/2007 | Matsuo et al. |
| 7,715,416 | B2 * | 5/2010 | Srinivasan et al. ............ 370/412 |
| 2002/0052972 | A1 | 5/2002 | Yim |
| 2003/0037154 | A1 | 2/2003 | Poggio et al. |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |
| 2005/0138620 | A1 | 6/2005 | Lewites |
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0174324 | A1 | 8/2006 | Zur et al. |
| 2008/0002736 | A1 | 1/2008 | Droux et al. |
| 2008/0019365 | A1 | 1/2008 | Tripathi et al. |

OTHER PUBLICATIONS

Tripathi, S.; "Crossbow: Network Virtualization and Resource Control"; Presentation to Sun Labs Open House; Jun. 1, 2006; (22 pages).
Belgaied, K. et al.; "Crossbow Hardware Resources Management and Virtualization"; Sep. 28, 2007; 14 pages.
Droux, N.; "Crossbow Network Virtualization Architecture"; Aug. 28, 2007; Solaris Core OS, Sun Microsystems, Inc.; 51 pages.
Khare, S.; "VLANs as VNICs"; Solaris Networking, Sun Microsystems, Inc.; Aug. 13, 2007; 9 pages.
Tripathi, S.; "Data Path: Soft Ring Set (SRS) and Soft Rings for Dynamic Polling & Parallelization"; Jul. 23, 2007; 7 pages.
Droux, N.; "Virtual Switching in Solaris"; Solaris Networking, Sun Microsystems, Inc.; Apr. 2, 2007; 6 pages.
Tripathi, S.; "Crossbow Architectural Document"; Nov. 21, 2006; 19 pages.
Nordmark, E., et al.; "IP Instances Interface Document"; PSARC 2006/366; Dec. 28, 2006; 18 pages.
Nordmark, E.; "IP Instances Design Document"; PSARC 2006/366; Dec. 21, 2006; 38 pages.
Tripathi, S.; "Crossbow: Solaris Network Virtualization & Resource Control"; Aug. 23, 2006; 9 pages.
Droux, N.; "Crossbow: Network Virtualization and Bandwidth Partitioning"; presented at CHOSUG, Jun. 19, 2007; 23 pages.
Nordmark; E.; "IP Instances—Network Isolation Meets Zones"; presented at SVOSUG, Oct. 26, 2006; 28 pages.
Tripathi, S.; "CrossBow: Network Virtualization and Resource Control"; presented at SVOSUG, Aug. 24, 2006; 27 pages.
Tripathi, S.; "CrossBow: Network Virtualization and Resource Control"; presented at Sun Labs Open House; Jun. 1, 2006; 24 pages.
Tripathi, S.; "Solaris Networking—The Magic Revealed (Part I)"; Sunay Tripathi's Solaris Networking Weblog; Nov. 14, 2005; (22 Pages).
http://www.cisco.com/en/US/solutions/collateral/ns340/ns517/ns224/ns783/white_paper_c11-462422.html, 2008, Cisco: Data Center Ethernet: Cisco's Innovation for Data Center Networks; 8 pages.
Reinemo, S-A., and Skeie, T., "Effective Shortest Path Routing for Gigabit Ethernet," Proceedings of the 2007 IEEE International Conference on Communications, Jun. 1, 2007 (6 pages).
Search Report in related European Patent Application No. 10164174.4 dated Sep. 2, 2010 (7 pages).

* cited by examiner

MANAGING TRAFFIC ON VIRTUALIZED LANES BETWEEN A NETWORK SWITCH AND A VIRTUAL MACHINE

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic.

In some networks, a switch is used to receive traffic from the sending system before sending it to the receiving system. Traditionally, the receiving system could exercise some control over incoming traffic sent from a switch. With advances in virtualization technology, computer systems may now include multiple concurrently executing operating systems. Operating systems executing on such systems may be unable to exercise the same control over incoming traffic from a switch without affecting other operating systems executing on the computer system.

SUMMARY

In general, in one aspect, the invention relates to a computer readable medium comprising software instructions for managing resources on a host, wherein the software instructions comprise functionality to: configure a classifier located on a physical network interface card (NIC), to forward packets addressed to a first destination address to a first hardware receive ring (HRR) mapped to a first virtual network interface card (VNIC), wherein the VNIC is executing on the host operatively connected to the physical NIC, wherein packets addressed to the first destination address are associated with a first priority-based flow control (PFC) lane; configure the classifier to forward packets addressed to a second destination address to a second HRR, wherein packets addressed to the second destination address are associated with a second PFC lane; and transmit, by the first VNIC, a first pause frame associated with the first PFC lane to a switch operatively connected to the physical NIC, wherein the switch, in response to receiving the first pause frame, stores packets associated with the first PFC lane in a buffer without transmitting the packets to the physical NIC.

In general, in one aspect, the invention relates to a computer readable medium comprising software instructions for managing resources on a host, wherein the software instructions comprise functionality to: receive, by a classifier located on a physical network interface card (NIC), a first plurality of packets addressed to a first destination address, wherein the first plurality of packets is associated with a first priority-based flow control (PFC) lane; forward, by the classifier, the first plurality of packets to a first hardware receive ring (HRR) mapped to a first virtual network interface card (VNIC), wherein the VNIC is executing on the host operatively connected to the physical NIC; transmit, by the physical NIC, a first pause frame associated with the first PFC lane to a switch operatively connected to the physical NIC, wherein the switch, in response to receiving the first pause frame, stores packets associated with the first PFC lane in a buffer without transmitting the packets to the physical NIC.

In general, in one aspect, the invention relates to a system comprising: a physical network interface card (NIC) comprising a classifier and a plurality of hardware receive rings (HRRs), wherein the classifier is configured to forward packets associated with a first destination address to a first HRR and forward packets associated with a second destination address to a second HRR, wherein packets addressed to the first destination address are associated with a first priority-based flow control (PFC) lane; and a host, operatively connected to the physical NIC, comprising at least one virtual NIC (VNIC) configured to receive packets from the first HRR, wherein the at least one VNIC is further configured to transmit a pause frame associated with the first PFC lane to a switch operatively connected to the physical NIC wherein the switch, in response to receiving the pause frame, stores packets associated with the first PFC lane in a buffer without transmitting the packets to the physical NIC.

Other aspect of the invention will be apparent from the following description and the appended claims.

DETAILED DESCRIPTION

Figure 1:
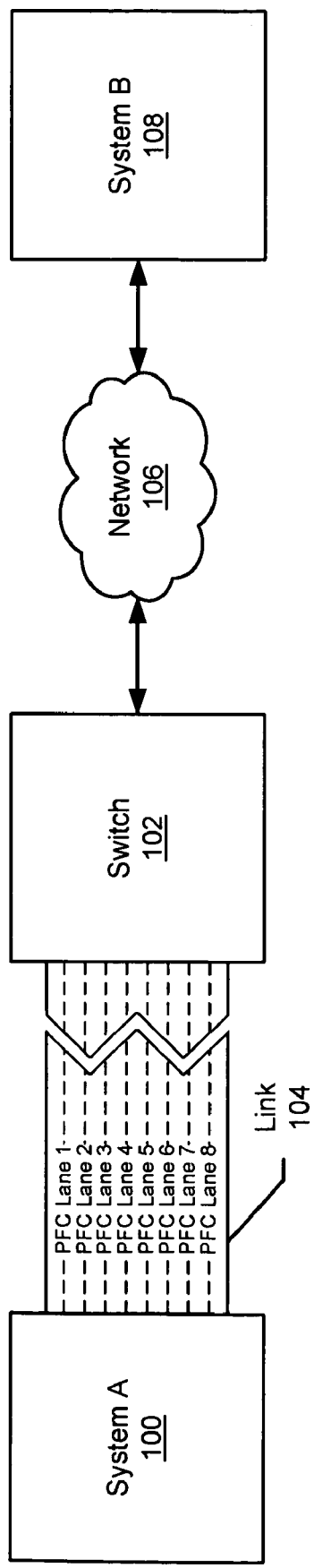
FIG. 1 shows a system in accordance with one or more embodiments of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to managing incoming traffic on a computer system using external network devices to enforce a usage policy. Specific embodiments of the invention relate to mapping priority based flow control (PFC) lanes to a virtual machine executing on a host (as also referred to as a physical host), extending the host's ability to enforce a usage policy associated with the virtual machine. Further embodiments relate to a method and system for issuing PFC pause frames by hardware and software elements on a host in order to manage incoming network traffic on a system associated with multiple destination addresses.

FIG. 1 shows a configuration in accordance with one embodiment of the invention. As shown in FIG. 1, the configuration includes a first system (e.g., system A (100)) operatively connected to a switch (102) via a link (104). System A (100) may be any system configured to receive data in the form of packets, datagrams, etc. Specific embodiments of a system in accordance with one or more embodiments of the invention are discussed in FIG. 2.

In one embodiment of the invention, the switch (102) provides an interface between system A (100) and other systems or nodes directly or indirectly connected to the switch (102). The switch (102), may include functionality to transmit signals in the form of packets, datagrams, etc. to other devices over the network (106), (e.g., system B (108)). The switch (102) may include ports for each device, memory, and a processing mechanism. The memory of the switch (102) may include configuration data corresponding to configuration settings for the switch (102). The memory may also include a table for maintaining information regarding the location of nodes in relation to the ports of the switch (102).

In one embodiment of the invention, the switch (102) may separate traffic using priority-based flow control (PFC). A PFC enabled switch includes functionality to separate traffic into different virtual lanes for transmission to a PFC enabled receiving device. Data may be separated based on one or more attributes or characteristics described within the frame of each data packet. A PFC enabled switch may also include the functionality to receive and interpret a PFC pause frame associated with a virtual lane. A PFC pause frame may include a request to stop sending traffic associated with one of the virtual lanes. A PFC pause frame may additionally specify a period of time after which traffic on the virtual lane may resume. In one embodiment of the invention, PFC is implemented in accordance with IEEE 802.1.

In one embodiment of the invention, the switch (102) is connected to system A (100) via a link (104). The link (104) corresponds to any physical communication channel (wired or wireless) over which data may be communicated. Further, the link (104) may be divided into virtual lanes (e.g., PFC lanes 1-8 as depicted in FIG. 1). In one embodiment of the invention, the switch (102) separates data traffic based on the destination address. In one embodiment of the invention, all traffic with the same destination address will be transmitted by the switch (102) across the same virtual lane (e.g., PFC Lane 1) to system A (100). A PFC pause frame executed by the switch (102) may delay network traffic on the specified virtual lane without affecting network traffic on other virtual lanes traversing the link (104).

Continuing with the discussion of FIG. 1, in one embodiment of the invention, a second system (e.g., system B (108)) communicates with system A (100) over the network (106). Data sent from system B (108) to system A (100) is received by the switch (102). In one embodiment of the invention, system A (100) may be associated with more than one destination address. The switch (102) may separate traffic intended for system A (100) according to its destination address. In one embodiment of the invention, all packets associated with one destination address on system A (100) are associated with a single virtual lane (e.g., PFC Lane 1).

Figure 2:
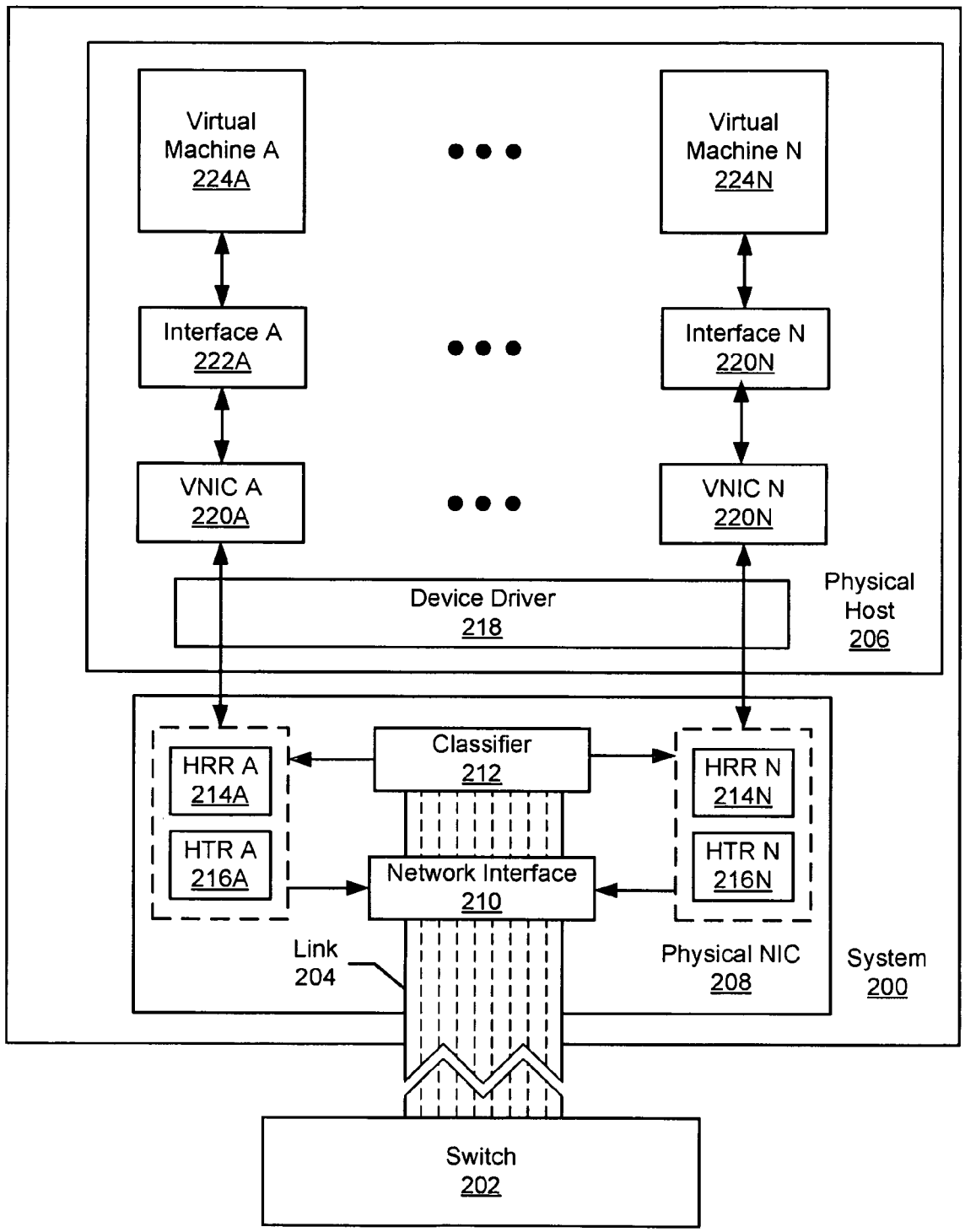
FIG. 2 shows a diagram of a guest operating system in accordance with one or more embodiments of the invention.

FIG. 2 shows a system and switch in accordance with one embodiment of the invention. As shown in FIG. 2, the system (200) is connected to the switch (202) via the link (204). The system (200) includes a host (206) operatively connected to a physical network interface card (NIC) (208).

In one embodiment of the invention, the physical NIC (208) provides an interface between the host (206) and a network (not shown) (e.g., a local area network, a wide area network, a wireless network, etc.). The physical NIC (208) may include a network interface (NI) (210), a classifier (212), one or more hardware receive rings (HRRs) (214A, 214N), and one or more hardware transmit rings (HTRs) (216A, 216N). In one embodiment of the invention, the NI (210) refers to the hardware used to interface with the network and may correspond to an RJ-45 connector, a wireless antenna, etc. The packets received by the NI (210) are then forwarded to other components on the physical NIC (208) for processing, etc. Those skilled in the art will appreciate that while the NI (210) described above as being part of the physical NIC (208), the NI (210) may be implemented using other hardware configurations (i.e., in hardware other than a "card").

In one embodiment of the invention, the classifier (212) is configured to analyze the incoming network traffic, typically in the form of packets, received from the network (not shown), via the switch (202). In one embodiment of the invention, the classifier (212) is configured to analyze the incoming network traffic, typically in the form of packets, received from the network (not shown). In one embodiment of the invention, analyzing the packets by the classifier (212) includes analyzing one or more fields in each of the packets to determine to which of the HRRs (214A, 214N) the packets are forwarded. As an alternative, the classifier (212) may use the contents of one or more fields in each packet as an index into a data structure that includes information necessary to determine to which HRR (214A, 214N) that packet is forwarded.

In one embodiment of the invention, the classifier (212) may separate traffic according to the same criteria used by the PFC-enabled switch (202). The classifier (212) may forward all packets associated with one or more PFC lanes to a single HRR (214A, 214N). For example, the PFC-enabled switch (202) may separate traffic based on destination MAC addresses. In such cases, the classifier may also separate traffic using destination MAC addresses in the same manner that the PFC-enabled switch separates traffic. The result of such classification by the classifier (212) is that all traffic associated with a given PFC lane is forwarded to the same HRR. In one embodiment of the invention, each PFC lane may be associated with a different HRR (214A, 214N).

Further, packets received on the same PFC lane may be further separated based on an enhanced transmission selection (ETS) priority. In one embodiment of the invention, ETS priority is implemented in accordance with IEEE 802.1Qaz. In one embodiment of the invention, the classifier (212) may use an ETS priority to determine the appropriate HRR (214A, 214N) to forward packets. Multiple HRRs (214A, 214N) may be associated with the same PFC lane, but each HRR (214A, 214N) associated with the same PFC lane may receive packets with a different ETS priority or group of ETS priorities.

In one embodiment of the invention, the classifier (212) may be implemented entirely in hardware (i.e., the classifier (212) may be a separate microprocessor embedded on the physical NIC (208)). Alternatively, the classifier (212) may be implemented in software stored in memory (e.g., firmware, etc.) on the physical NIC (208) and executed by a microprocessor on the physical NIC (208). Further, in one embodiment of the invention, the physical NIC (208) may include a direct memory access (DMA) engine, which includes functionality to transfer packets from the physical NIC (208) to the host (206).

In one embodiment of the invention, the HRRs (214A, 214N) correspond to portions of memory within the physical NIC (208) used to temporarily store the received packets. In one embodiment of the invention, the HRRs (214A, 214N) are configured to receive packets from the classifier (212). Each HRR (214A, 214N) may receive packets associated with one or more PFC lanes. Packets received by a HRR (214A, 214N) may be transmitted to a virtual NIC (VNIC) (220A, 220N) residing on the host (206).

In one embodiment of the invention, the HTRs (216A, 216N), correspond to buffers on the physical NIC (208), and are configured to receive packets from the host (206) and forward such packets to the NI (210). In one embodiment of the invention, the HTRs (216A, 216N) are configured to receive outbound packets from one or more VNICs (220A, 220N).

In one embodiment of the invention, the physical NIC (208) includes the functionality to determine whether the rate of incoming data associated with a PFC lane violates one or more usage policies. In one embodiment of the invention, the usage policy is violated when a HRR (214A, 214N) on the physical NIC (208) receives data at a rate above a predetermined threshold. In one embodiment of the invention, the usage policy is violated when the number of packets dropped by a HRR (214A, 214N) exceeds a predetermined threshold. In one embodiment of the invention, the physical NIC (208) includes functionality to anticipate a potential or imminent violation of the usage policy. For example, the usage policy may (a) specify that a policy violation occurs when 10 packets are dropped by an HRR and (b) specify that a pause frame should be sent out when 8 packets are dropped. In this scenario, the usage policy may be said to anticipate a potential or imminent violation when (b) is satisfied. In one embodiment of the invention, (b) is set to take into account the response delay (i.e., the time between the issuance of the pause frame and the receipt/implementation of the pause frame/pause by the switch with respect to the corresponding virtual lane), such that even with the response delay, (a) in the usage policy is not likely to be violated. In one embodiment of the invention, the physical NIC (208) may notify a VNIC (220A, 220N) when the usage policy has been violated. Those skilled in the art will appreciate that the usage policies are not limited to those listed above. In addition, those skilled in the art will appreciate that a different usage policy may be enforced by each HRR (214A, 214N).

In one embodiment of the invention, the physical NIC (208) includes functionality to send a PFC pause frame to a PFC enabled switch (i.e., switch (202)) in response to a violation of a usage policy. The PFC pause frame may instruct the switch (202) to delay transmitting packets associated with a PFC lane. The PFC pause frame may also indicate the length of the delay.

In one embodiment of the invention, the host (206) may include the following components: a device driver (218), one or more VNICs (220A, 220N), one or more virtual network stacks (VNSs) (222A, 222N), and one or more virtual machines (VMs) (224A, 224N). Each of these components is described below. In one embodiment of the invention, the device driver (206) provides an interface between the HRRs (214A, 214N) and HTRs (216A, 216N), and the host (206). More specifically, the device driver (218) exposes the HRRs (214A, 214N) and the HTR (216A, 216N) to the host (206).

In one embodiment of the invention, each VNIC (220A, 220N) is located within the media access control (MAC) layer of the host. In one embodiment of the invention, each of the VNICs (220A, 220N) is associated with one or more HRRs (214A, 214N) and one or more HTRs (216A, 216N). The VNICs (220A, 220N) provide an abstraction layer between the physical NIC (208) and the various packet destinations (not shown) on the host (206). More specifically, each VNIC (220A, 220N) operates like a physical NIC (208). For example, in one embodiment of the invention, each VNIC (220A, 220N) is associated with one or more MAC addresses, one or more Internet Protocol (IP) addresses, one or more ports, and configured to handle one or more protocol types. Thus, while the host (206) may be operatively connected to a single physical NIC (208), packet destinations and other applications on the host (206) operate as if the host (206) is bound to multiple physical NICs. Said another way, each VNIC (220A, 220N) operates like a separate network device connected to the network.

In one embodiment of the invention, each VNIC (220A, 220N) may be associated with one or more PFC lanes. Specifically, each VNIC may receive all packets associated with a PFC lane or a group of PFC lanes, and only those packets associated with the PFC lane or group of PFC lanes. In one embodiment of the invention, each VNIC (220A, 220N) includes functionality to issue a PFC pause frame directing the switch (202) to delay all traffic associated with a PFC lane. In one embodiment of the invention, a VNIC (220A, 220N) may issue a PFC pause frame in response to a violation of a usage policy associated with that VNIC (220A, 220N). A violation of a usage policy may occur when the VNIC (220A, 220N) receives data at a rate above a predetermined threshold. A violation of a usage policy may occur when a HRR (214A, 214N) associated with the VNIC (220A, 220N) issues interrupts to a corresponding CPU at a rate above a predetermined threshold. Those skilled in the art will appreciate that the usage policies are not limited to those listed above. Further, those skilled in the art will appreciate that a different usage policy may be enforced by each VNIC (220A, 220N). In addition, in one embodiment of the invention, each VNIC (220A, 220N) may communicate with the associated HRRs (214A, 214N) to determine when a violation of a usage policy has occurred.

Each of the VNICs (220A, 220N) is operatively connected to a corresponding interface (222A, 222N). In one embodiment of the invention, each interface (222A, 222N) includes functionality to forward packets to the corresponding VM (224A, 224N) and to receive packets from the corresponding VM (224A, 224N). Further, the interface (222A, 222N) includes functionality to enable the VMs (224A, 224N) to communicate with the host (206) upon which they are executing.

In one embodiment of the invention, each VM (224A, 224N) is associated with a usage policy. The usage policy may be a set of computing resources available to a (224A, 224N). The usage policy may also dictate a maximum rate at which computing resources by be utilized by the VM (224A, 224N). Information associated with the usage policy may include a combination of metrics that, when combined, indicate a potential or imminent violation of the usage policy. Those skilled in the art with appreciated that the usage policies are not limited to those listed above. In one embodiment of the invention, one or more usage policies associated with a VM (224A, 224N) may enforced by other elements on the host (206), physical NIC (208), or switch (202).

In one embodiment of the invention, the host OS (not shown) is configured to provide functionality to create virtual execution environments (e.g., virtual machines) (224A, 224N) in which the guest OSs may execute. Further, the host OS may include functionality to manage the aforementioned virtual environments. The virtual environments may be provided using well known techniques in the art. An example of virtual execution environment is a Solaris™ Container. In such cases, the Solaris™ Container may execute in the host OS, which may be a Solaris™ OS. Solaris™ is a trademark of Sun Microsystems, Inc. Those skilled in the art will appreciate that other virtualization technologies such as VMware® Server (VMware® a registered trademark of VMware, Inc.) and Xen® (Xen® is a trademark overseen by the Xen Project Advisory Board) may also be used to provide virtual execution environments.

In one embodiment of the invention, each virtual execution environment includes functionality to execute an operating system (i.e., a guest OS). Further, each virtual execution environment may be isolated such that processes within a virtual execution environment may not communicate with other processes in other virtual execution environments. In addition, each virtual execution environment may be associated with a portion of the total hardware and processing resources of the host. In one embodiment of the invention, the host OS may include the functionality to send messages to, and receive messages from, elements within each of the virtual execution environments, including the guest OSs. In one or more embodiments of the invention, VNICs appear as physical NICs to the VMs. In one embodiment of the invention, the VMs (224A, 224N) include functionality to communicate with other elements within the host (206).

Figure 3A:
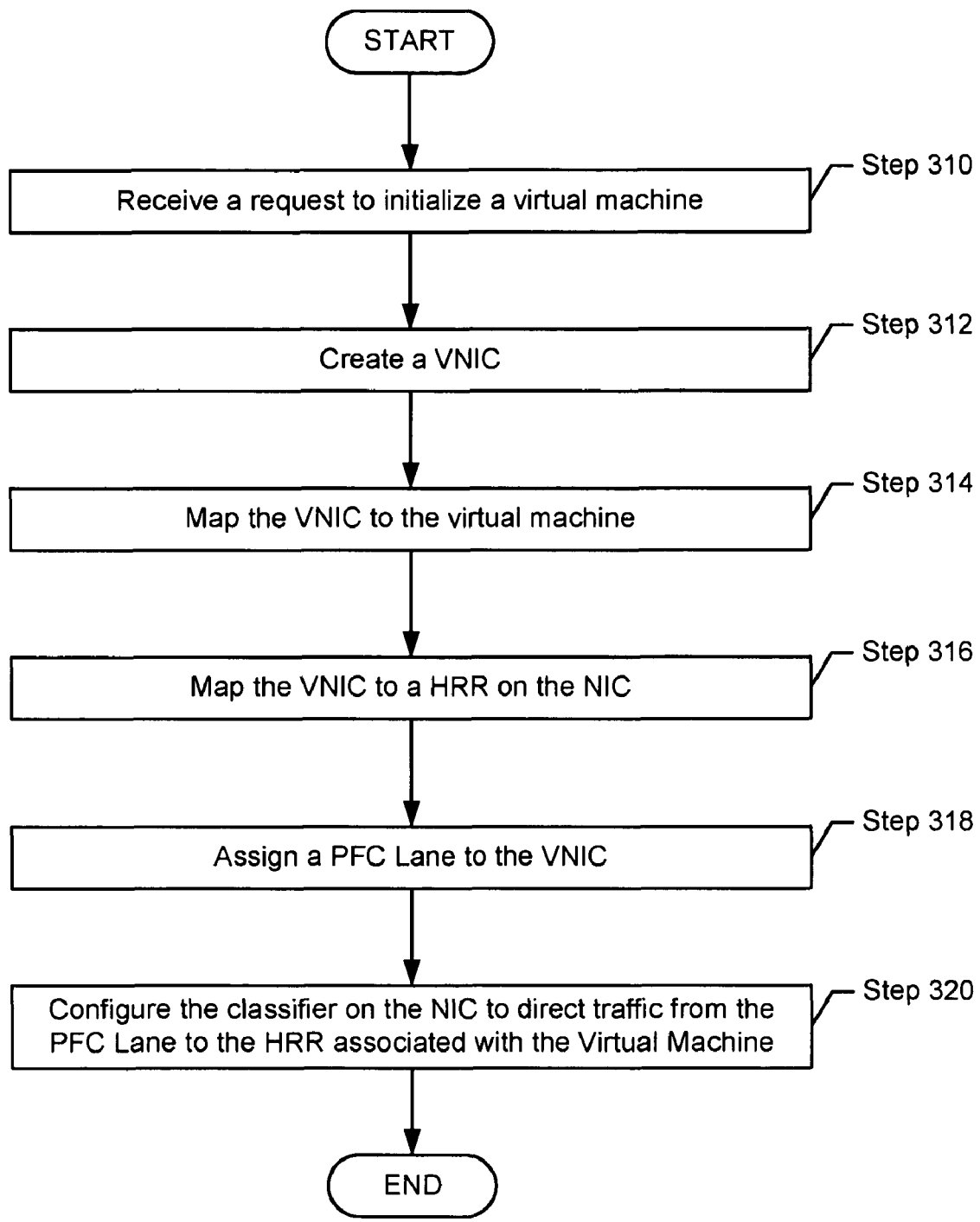
FIG. 3A shows a flowchart in accordance with one or more embodiments of the invention.

FIG. 3A shows a flow chart for receiving packets by a classifier configured accordance with one or more embodiments of the invention. In one or more embodiments of the invention, one or more of the steps shown in FIG. 3A may be omitted, repeated, and/or performed in a different order than that shown in FIG. 3A. Accordingly, the specific arrangement of steps shown in FIG. 3A should not be construed as limiting the scope of the invention.

In Step 310, the host receives a request to initialize a virtual machine. In Step 312, the host creates a VNIC. In Step 314, the host maps the VNIC to the virtual machine. In Step 316, the host maps the VNIC to a HRR on the physical NIC. In Step 318, the host assigns a PFC lane to the VNIC. In Step 318, the host configures the classifier on the physical NIC to direct traffic from the PFC lane to the HRR associated with the virtual machine. The resulting data path is discussed in FIG. 3B.

Figure 3B:
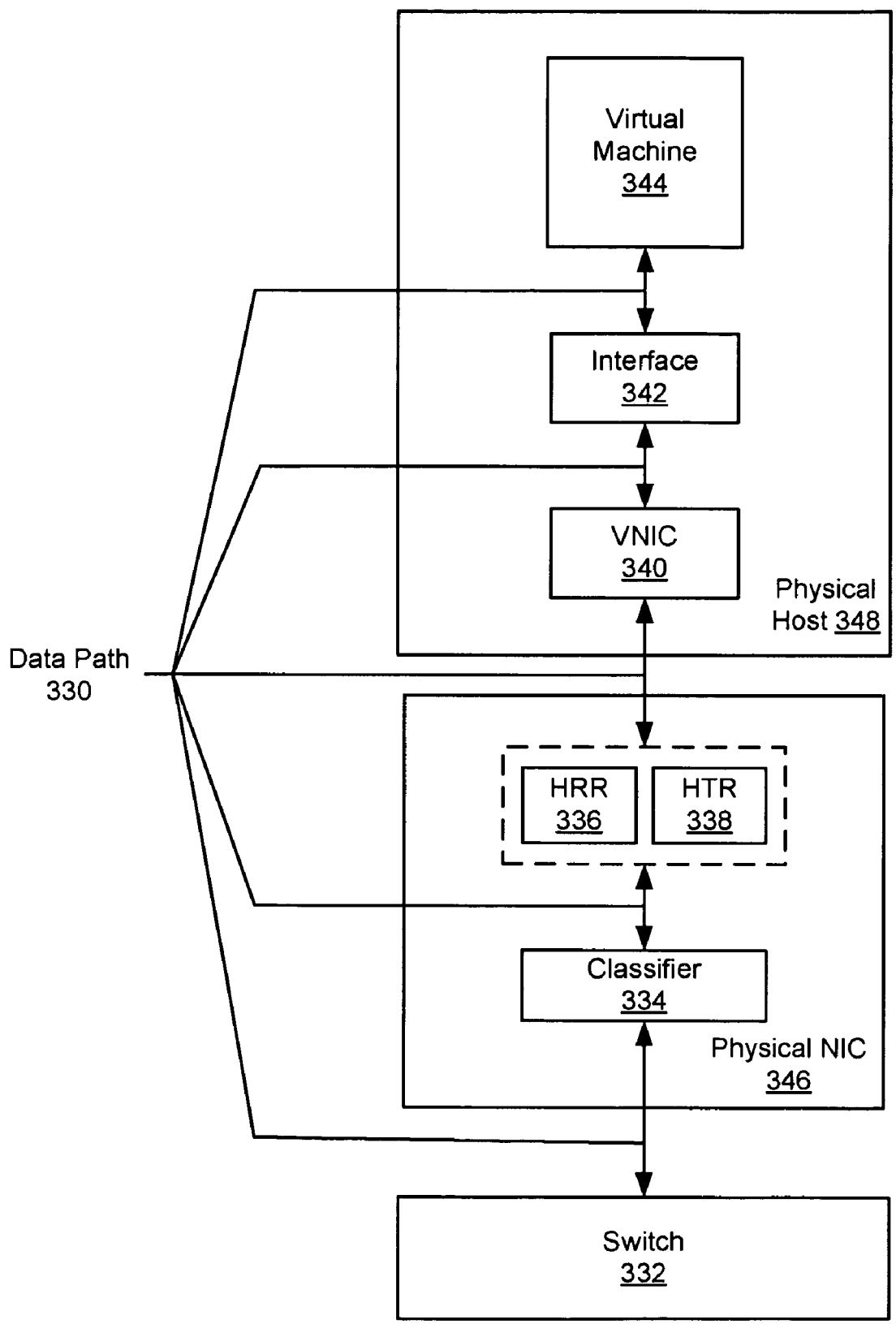
FIG. 3B shows a diagram of an example in accordance with one or more embodiments of the invention.

FIG. 3B shows an example data path created once the steps in FIG. 3A have been performed in accordance with one or more embodiments of the invention. The exemplary data path is not intended to limit the scope of the invention. Further, some elements unnecessary for the purposes of the exemplary data path may have been omitted.

As depicted in FIG. 3B, in one embodiment of the invention, executing the steps described in FIG. 3A results in a data path (330) from a switch (332) to a VM (344), where the data path (330) includes a classifier (334), a HRR (336) and HTR (338), a VNIC (340), and an interface (342). The classifier (334), HRR (336), and HTR (338) reside within the physical NIC (346). The VNIC (340), interface (342), and VM (344) reside within the host (348). In one embodiment of the invention, the VNIC (340) includes functionality to enforce a usage policy associated with the VM (344) across the entirety of a data path (330) created in accordance with the invention. In addition, in one embodiment of the invention, actions taken by the VNIC (340) to enforce the usage policy associated with one VM (344) and one data path (330) do not affect the traffic or resource usage of other data paths (not shown) between the same switch (332) and a different VM (not shown) executing on the same host (348).

Figure 4:
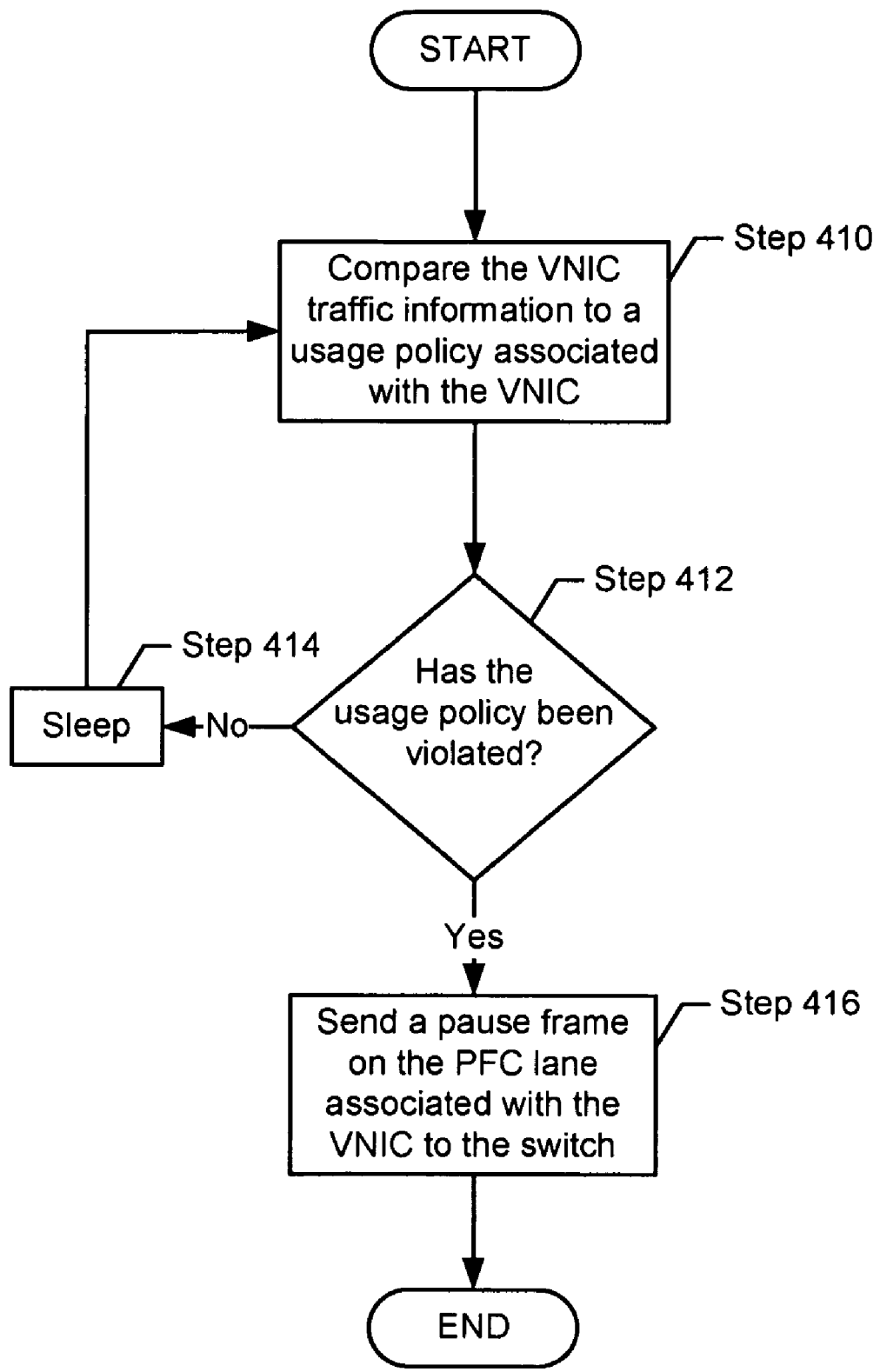
FIG. 4 shows a flowchart in accordance with one or more embodiments of the invention.

FIG. 4 shows a flow chart for receiving packets by a classifier configured accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

In Step 410, the data traffic information received by the VNIC is compared to a usage policy associated with the VNIC. In Step 412, a determination is made regarding whether the usage policy has been violated. If the usage policy has not been violated, then in Step 414, the VNIC waits to gather more data traffic information. If the data traffic information indicates a violation of the usage policy, then the process proceeds to Step 416. In Step 416, the VNIC sends a PFC pause frame on the PFC lane associated with the VNIC to the switch. In one embodiment of the invention, a PFC pause frame is sent in response to a violation of the usage policy, or in anticipation of a violation of the usage policy. Further, in one embodiment of the invention, a PFC pause frame is sent in response to a set of metrics that, when combined, indicate a potential or imminent violation of the usage policy.

Figure 5A:
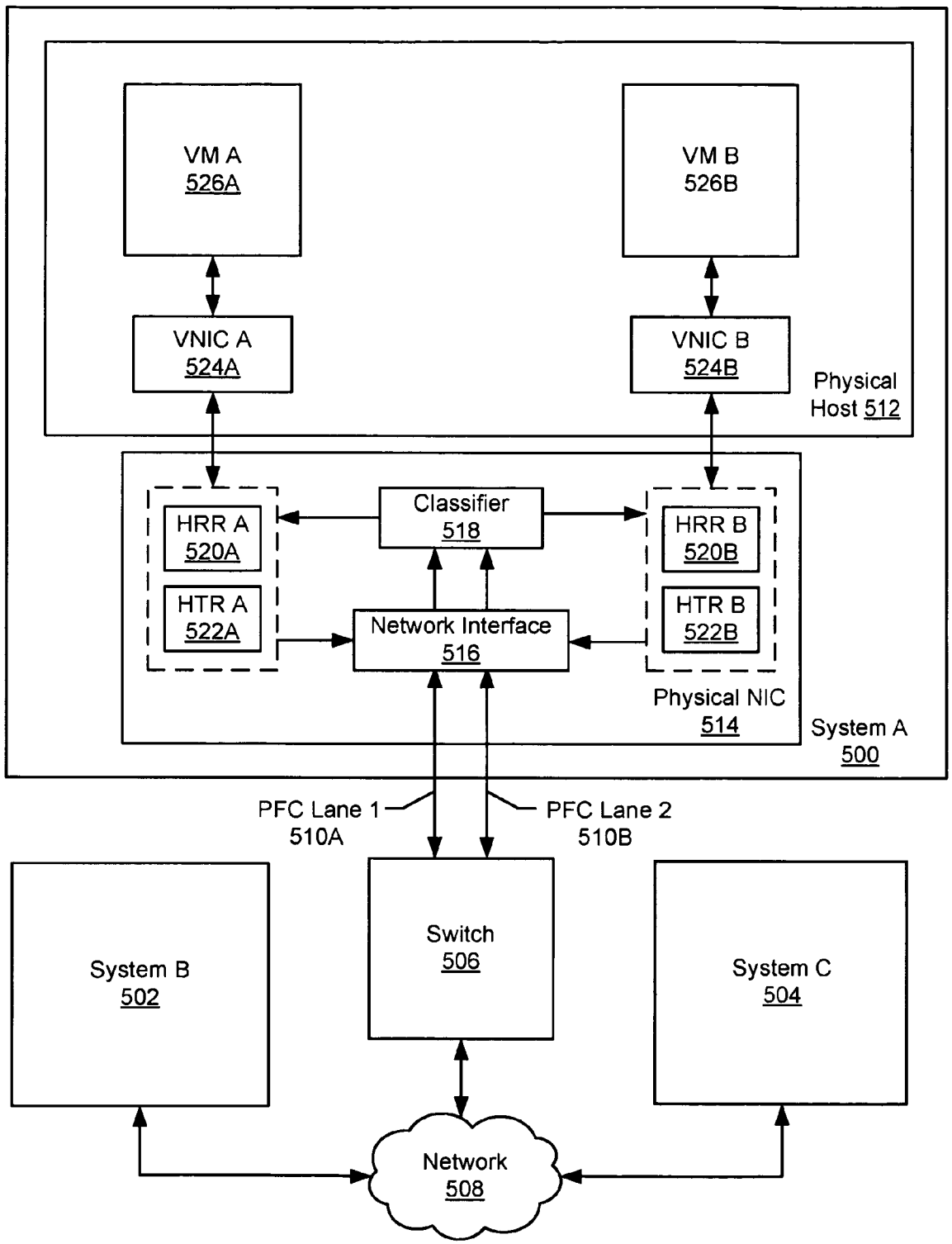
FIG. 5A shows a diagram of an example in accordance with one or more embodiments of the invention.
Figure 5B:
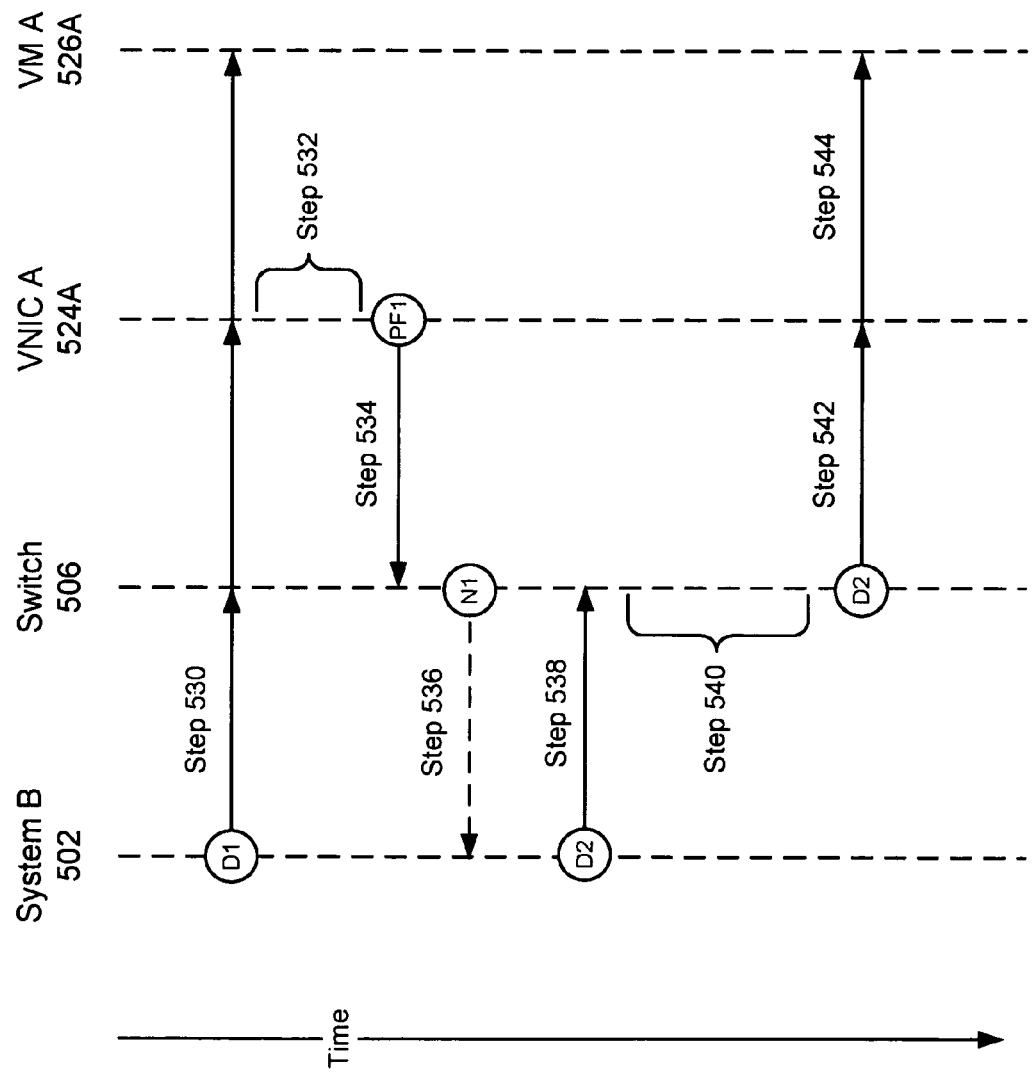
FIG. 5B shows a diagram of an example in accordance with one or more embodiments of the invention.

FIGS. 5A and 5B show an exemplary configuration and timeline in accordance with one embodiment of the invention. The exemplary system is not intended to limit the scope of the invention. Further, some elements unnecessary for the purposes of the exemplary figure may have been omitted.

As depicted in FIG. 5A, the exemplary configuration includes three systems: system A (500) system B (502), and system C (504). System A (500) is operatively connected to the switch (506), and system B (502) and system C (504) are connected to the switch (596) via the network (508).

The switch (506) includes the PFC functionality described above. Specifically, the switch (506) includes functionality to separate traffic based on a characteristic or attribute of the traffic (e.g., the destination MAC addresses of the packets), and transmit each category of traffic along one of the virtual PFC lanes (PFC lane 1 (510A), PFC lane 2 (510B)) to system A (500). Assume, for the purposes of the example, that the switch (506) is configured to separate traffic based on the destination MAC address of each packet. Traffic addressed to VM A (526A) is associated with PFC lane 1 (510A). Traffic addressed to VM B (526B) is associated with PFC lane 2 (510B).

As depicted in the exemplary configuration of FIG. 5A, system A (500) includes a host (512) operatively connected to a physical NIC (514). The physical NIC (514) includes a NI (516), a classifier (518), two HRRs (HRR A(520A), HRR B, (520B)), and two HTRs (HTR A(522A), HTR B, (522B)). The host (512) includes two VNICs (VNIC A (524A), VNIC B (524B)) and two VMs (VM A (526A), VM B (526B)). Assume, for the purposes of the example, that VNIC A (524A) is associated with a usage policy that directs VNIC A (524A) to issue a PFC pause frame in the event that the rate at which packets are received exceeds a predetermined threshold.

Data (typically in the form on packets) addressed to VM A (526A) (or more specifically, includes the MAC address for VNIC A as the destination MAC address) or VM B (526B) (or more specifically, includes the MAC address for VNIC B as the destination MAC address) is received by the NI (516) on the physical NIC (514) and sent to the classifier (518). The classifier (518) determines which HRR (520A, 520B) is to receive the data. Assume, for the purposes of the example, data addressed to VM A (526A) is forwarded by the classifier (518) to HRR A (520A), and data addressed to VM B (526B) is forwarded by the classifier (518) to HRR B (520B).

As depicted in the exemplary timeline depicted in FIG. 5B, in Step 530, a first set of data (data 1 (D1)) is transmitted from system B (502) addressed to VM A (526A). The data (D1) is transmitted through the network to the switch (506). The switch (506) associates the traffic with PFC lane 1 (510) and transmits the data (D1) to system A (500). The data (D1) is received by the NI (516) and forwarded to the classifier (518). The classifier (518) forwards the data (D1) to HRR A (520A). HRR A (520A) then forwards the data (D1) to VNIC A (524A) on the host (512). VNIC A (524A) processes the data (D1) and forwards the processed data (D1) to VM A (526A).

In Step 532, VNIC A (524A) determines that the rate at which packets are being received is above the predetermined threshold, and therefore a violation of the usage policy has occurred. In Step 534, VNIC A (524A) issues a PFC pause frame (PF1) for PFC lane 1 (510A) to the switch (506). The PFC pause frame specifies an amount of time during which no packets associated with PFC lane 1 (510A) are to be sent to system A (500).

Once the switch (506) receives the PFC pause frame (PF1) for PFC lane 1 (510A), the switch (506) stops transmitting packets associated with PFC lane 1 (510A), which would be packets with the destination MAC address associated with VNIC A. Packets addressed to VM A (526A) which were not sent before the PFC pause frame (PF1) is received and executed are stored in a buffer associated with PFC lane 1 (510A). Optionally, in Step 536, the switch may send a notification (Ni) to the sending system (system B (502)) that traffic associated with the destination address of VM A (526A) has been paused.

In Step 538, data (D2) arriving from system B (502) addressed to VM A (526A) after the PFC pause frame (PF1) has been executed, is stored in the buffer associated with PFC lane 1 (510A). In Step 540, the delay specified in the PFC pause frame (PF1) has expired. In Step 542 the data (D2) stored in the buffer associated with PFC lane 1 (510A) is transmitted to system A (500), and arrives at VNIC A (524A). In Step 544, the data (D2) is forwarded to VM A (526A).

Those skilled in the art will appreciate that while a pause frame is sent to the switch for the PFC lane associated with VM A, VM B may continue to receive data from the switch over the PFC lane associated with the VM B.

One or more embodiments of the invention provide a method and system to regulate traffic on a per-VM basis between the switch and a NIC.

Figure 6:
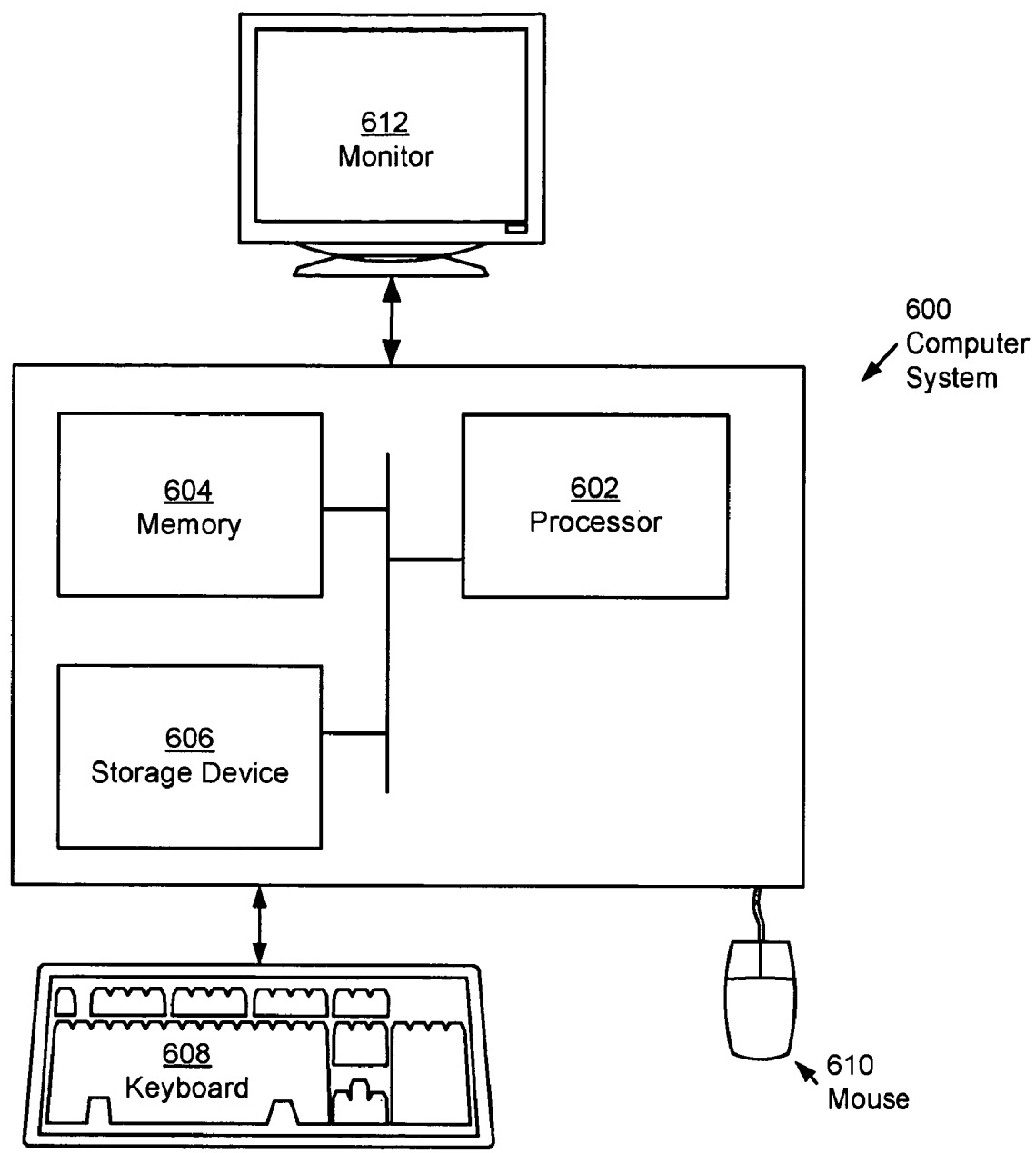
FIG. 6 shows a computer system in accordance with one or more embodiments of the invention.

An embodiment of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network via a network interface connection (not shown). Those skilled in the art will appreciate that these input and output means may take other forms. Further, those skilled in the art will appreciate that one or more elements of the aforementioned computer (600) may be remotely located and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A non-transitory computer readable medium comprising software instructions for managing resources on a host, wherein the software instructions comprise functionality to:
configure a classifier located on a physical network interface card (NIC), to forward packets addressed to a first destination address to a first hardware receive ring (HRR) mapped to a first virtual network interface card (VNIC), wherein the first VNIC is executing on the host operatively connected to the physical NIC, wherein packets addressed to the first destination address are associated with a priority-based flow control (PFC) lane;
configure the classifier to forward packets addressed to a second destination address to a second HRR, wherein packets addressed to the second destination address are associated with a second PFC lane; and
transmit, by the first VNIC in response to a violation of a usage policy, a pause frame associated with the PFC lane to a switch operatively connected to the physical NIC,
wherein the switch, in response to receiving the pause frame, stores packets associated with the PFC lane in a buffer without transmitting the packets to the physical NIC,
wherein the first VNIC is associated with a distinct internet protocol (IP) address, and
wherein the first VNIC is located in a media access control (MAC) layer of the host,
and wherein the usage policy is violated when at least one selected from a group consisting of (a) the number of interrupts issued by the first HRR exceeds a predetermined threshold, (b) the number of packets dropped by the first HRR exceeds a predetermined threshold, (c) when the number of bytes received by the first HRR exceeds a predetermined threshold occurs.

2. The computer readable medium of claim 1, wherein packets received by the second HRR are forwarded to a second VNIC executing on the host.

3. The computer readable medium of claim 2, wherein the second VNIC is associated with a distinct IP address.

4. The computer readable medium of claim 2, wherein the second VNIC is located in a MAC layer of the host.

5. The computer readable medium of claim 1, wherein the switch, in response to an expiration of a delay specified by the pause frame, forwards packets associated with the PFC lane to the physical NIC.

6. The computer readable medium of claim 1, wherein packets associated with the PFC lane that are assigned a first enhanced transmission selection (ETS) priority are forwarded to a third HRR, wherein the third HRR is associated with the first VNIC.

7. A non-transitory computer readable medium comprising software instructions for managing resources on a host, wherein the software instructions comprise functionality to:
receive, by a classifier located on a physical network interface card (NIC), a first plurality of packets addressed to a first destination address, wherein the first plurality of packets is associated with a priority-based flow control (PFC) lane;
forward, by the classifier, the first plurality of packets to a first hardware receive ring (HRR) mapped to a virtual network interface card (VNIC), wherein the VNIC is executing on the host operatively connected to the physical NIC, wherein the VNIC is associated with a distinct internet protocol (IP) address, and wherein the VNIC is located in a media access control (MAC) layer of the host;
transmit, by the physical NIC in response to a violation of a usage policy, a pause frame associated with the PFC lane to a switch operatively connected to the physical NIC, wherein the switch, in response to receiving the pause frame, stores packets associated with the PFC lane in a buffer without transmitting the packets to the physical NIC, and wherein the usage policy is violated when at least one selected from a group consisting of (a) the number of interrupts issued by the first HRR exceeds a predetermined threshold, (b) the number of packets dropped by the first HRR exceeds a predetermined threshold, (c) when the number of bytes received by the first HRR exceeds a predetermined threshold occurs.

8. The computer readable medium of claim 7, wherein the switch, in response to an expiration of a delay specified by the pause frame, forwards packets associated with the PFC lane to the physical NIC.

9. The computer readable medium of claim 7, wherein packets associated with the PFC lane that are assigned a first enhanced transmission selection (ETS) priority are forwarded to a second HRR, wherein the second HRR is associated with the VNIC.

10. A system comprising:
a physical network interface card (NIC) comprising a classifier and a plurality of hardware receive rings (HRRs), wherein the classifier is configured to forward packets associated with a first destination address to a first HRR and forward packets associated with a second destination address to a second HRR, wherein packets addressed to the first destination address are associated with a priority-based flow control (PFC) lane; and a physical host, operatively connected to the physical NIC, comprising at least one virtual NIC (VNIC) configured to receive packets from the first HRR, wherein the at least one VNIC is associated with a distinct internet protocol (IP) address and wherein the at least one VNIC is located in a media access control (MAC) layer of the host, wherein the at least one VNIC is further configured to transmit, in response to a violation of a usage policy, a pause frame associated with the PFC lane to a switch operatively connected to the physical NIC, wherein the switch, in response to receiving the pause frame, stores packets associated with the PFC lane in a buffer without transmitting the packets to the physical NIC, and wherein the usage policy is violated when at least one selected from a group consisting of (a) the number of interrupts issued by the first HRR exceeds a predetermined threshold, (b) the number of packets dropped by the first HRR exceeds a predetermined threshold, (c) when the number of bytes received by the first HRR exceeds a predetermined threshold occurs.

11. The system of claim 10, further comprising:
a data path comprising the switch, the physical NIC, at least one VNIC, and a virtual machine, wherein the at least one VNIC enforces the usage policy on traffic sent across the data path.

* * * * *